US012716997B2

(12) United States Patent
Schwark et al.

(10) Patent No.: US 12,716,997 B2
(45) Date of Patent: Aug. 25, 2026

(54) RADAR TARGET SIMULATION WITH RANGE MIGRATION

(71) Applicant: GM Cruise Holdings LLC, San Francisco, CA (US)

(72) Inventors: Christoph Schwark, Munich (DE); Felix Lenze, Munich (DE)

(73) Assignee: GM Cruise Holdings LLC, San Francisco, CA (US)

( * ) Notice: Subject to any disclaimer, the term of this patent is extended or adjusted under 35 U.S.C. 154(b) by 198 days.

(21) Appl. No.: 18/405,581

(22) Filed: Jan. 5, 2024

(65) Prior Publication Data

US 2025/0172663 A1 May 29, 2025

(30) Foreign Application Priority Data

Nov. 27, 2023 (EP) .................................... 23212380

(51) Int. Cl.
*G01S 7/40* (2006.01)

(52) U.S. Cl.
CPC .................................. *G01S 7/4056* (2013.01)

(58) Field of Classification Search
CPC .... G01S 13/584; G01S 13/931; G01S 7/4056; G01S 7/406; G09B 9/54
See application file for complete search history.

(56) References Cited

U.S. PATENT DOCUMENTS 11,469,876 B1 * 10/2022 DeMarco ................ G01S 7/282
11,520,008 B2 * 12/2022 Lee ....................... G01S 7/4052
2019/0041496 A1 * 2/2019 Salvesen ............... G01S 7/4052
2021/0293924 A1 * 9/2021 Chritton ................ G01S 7/4021
2022/0179044 A1 * 6/2022 Vook ..................... G01S 7/4069

FOREIGN PATENT DOCUMENTS

WO 2017069695 A1 4/2017

OTHER PUBLICATIONS

Extended European Search Report from European Application No. 23212380.2 dated May 10, 2024, 20 pages.
Diewaltd, et al., Arbitrary Angle of Arrival in Radar Target Sumulation, Cornell University Library, Jul. 6, 2021, 8 pages.
Rippl, et al., Near Range Target Generation by Direct Replay of Measurement, German Microwave Conference, May 2022, pp. 72-75.

* cited by examiner

*Primary Examiner* — Timothy A Brainard
(74) *Attorney, Agent, or Firm* — Honigman LLP; Matthew H. Szalach

(57) ABSTRACT

Disclosed herein is a radar target simulator (RTS) device including a processor and a memory. The memory stores computer-readable instructions that, when executed by the processor, cause the processor to perform acts including receiving a test sensor probe signal from a test sensor. The acts further include generating a first virtual target for a radar target simulation and transmitting a virtually reflected waveform responsive to the test sensor probe signal for the radar target test simulation, wherein the virtually reflected waveform is based at least in part on a change in a position of the first virtual target.

19 Claims, 9 Drawing Sheets

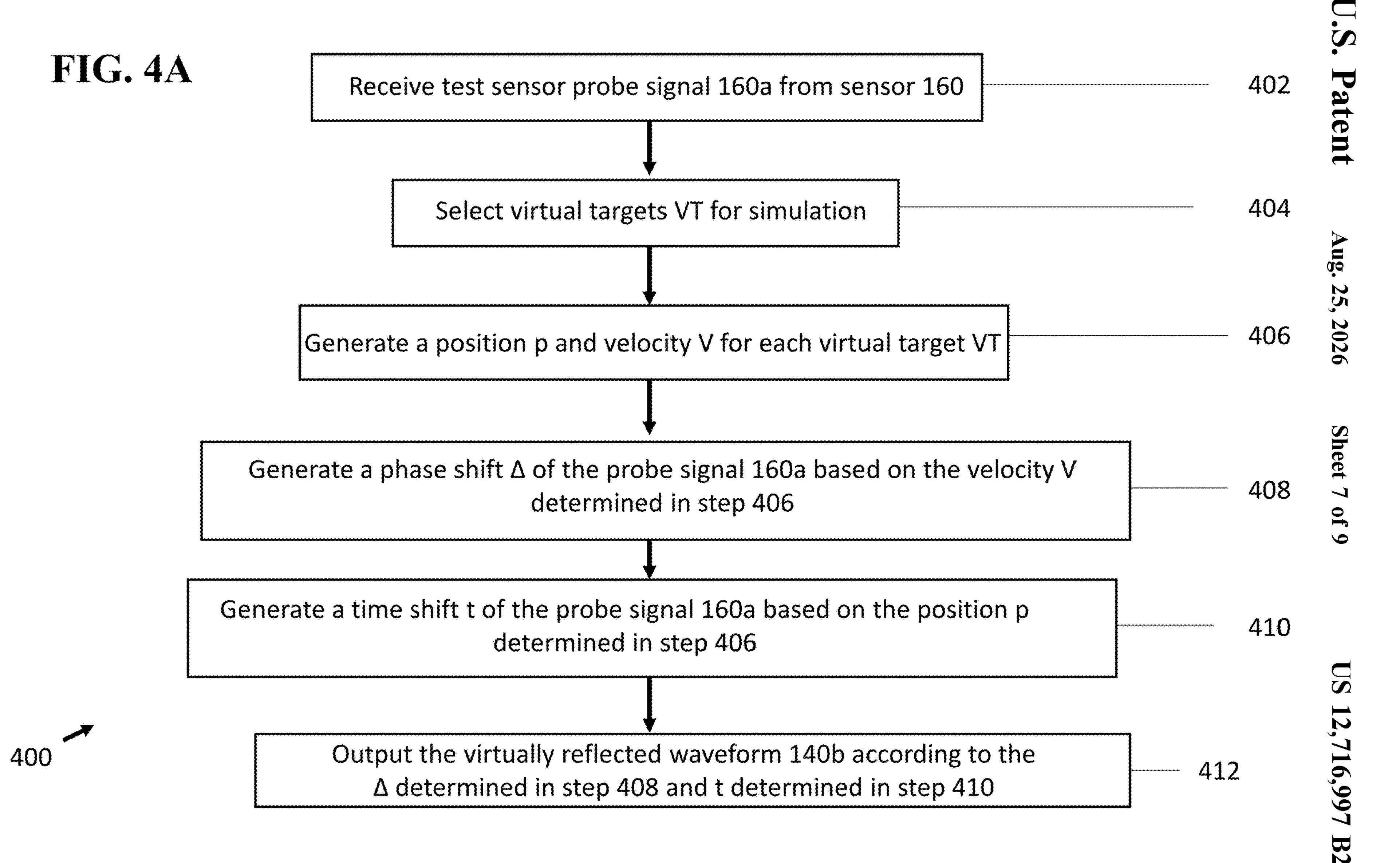
FIG. 4A
Receive test sensor probe signal 160a from sensor 160
402
Select virtual targets VT for simulation
404
Generate a position p and velocity V for each virtual target VT
406
Generate a phase shift Δ of the probe signal 160a based on the velocity V determined in step 406
408
Generate a time shift t of the probe signal 160a based on the position p determined in step 406
410
Output the virtually reflected waveform 140b according to the Δ determined in step 408 and t determined in step 410
412
400

Figure 4B:
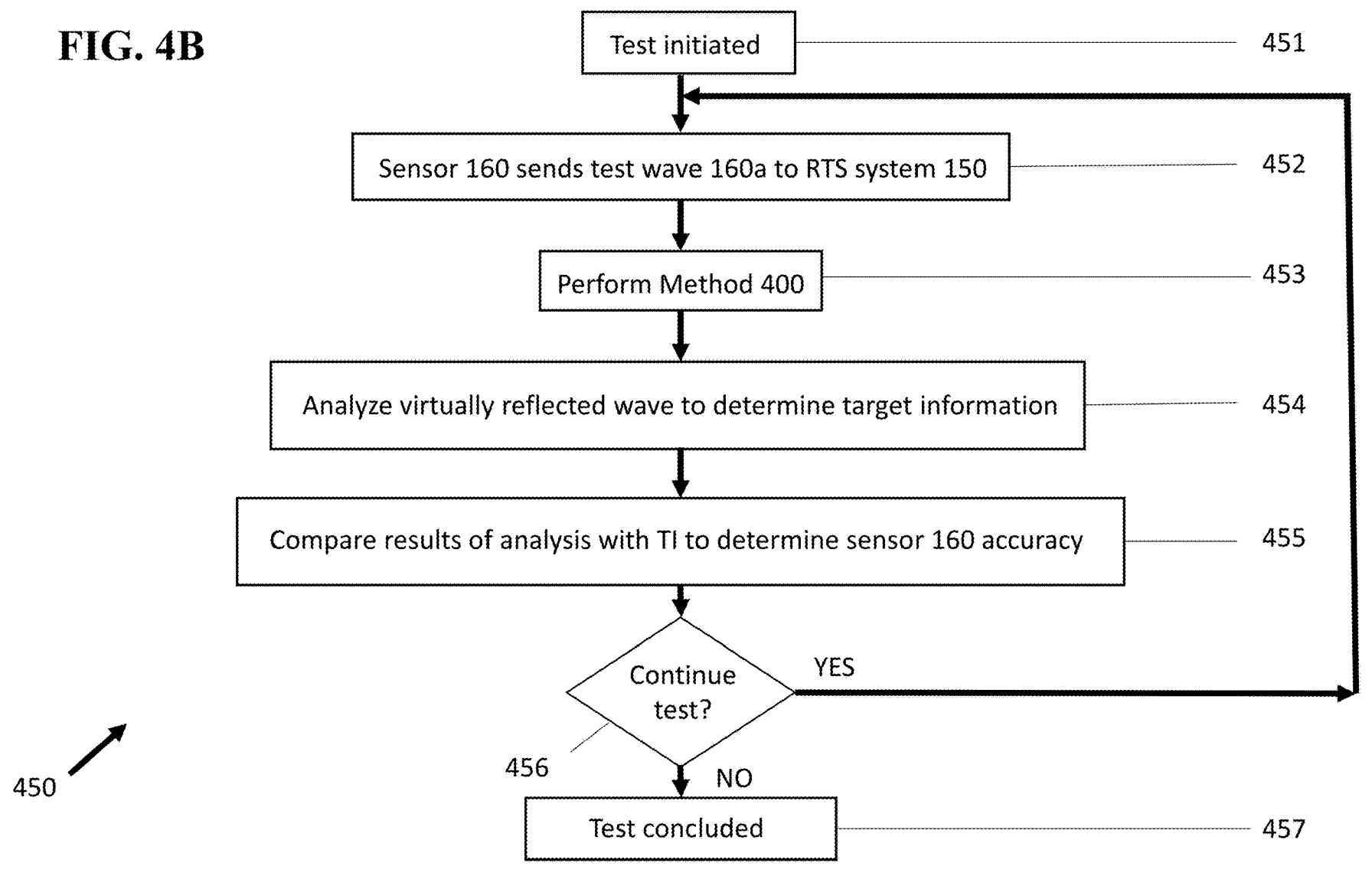

451 Test initiated

452 Sensor 160 sends test wave 160a to RTS system 150

453 Perform Method 400

454 Analyze virtually reflected wave to determine target information

455 Compare results of analysis with TI to determine sensor 160 accuracy

456 Continue test?

YES

NO

457 Test concluded

RADAR TARGET SIMULATION WITH RANGE MIGRATION

RELATED APPLICATION

This application claims priority to European Patent Application No. 23212380.2, filed on Nov. 27, 2023, and entitled "RADAR TARGET SIMULATION WITH RANGE MIGRATION". The entirety of this application is incorporated herein by reference.

BACKGROUND

Radar Target Simulators (RTS) are commonly used in the development and validation of radar sensor systems. They can be particularly useful in evaluating performance of systems using Frequency-Modulated Continuous-Wave Radar (FMCW Radar).

Generally, an RTS evaluates and tests radar sensor performance by measuring response to one or more known "virtual targets." A virtual target is a virtual or mathematical representation of an object for testing certain aspects of sensor performance (e.g., an object that represents something the sensor may encounter and detect when it is deployed). For example, if the sensor is to be deployed as part of a system to navigate a vehicle, the virtual target may represent a vehicle, a tree, or a wall to be detected during vehicle operation.

The RTS defines the virtual target and assigns properties to it. Those properties can encompass any virtual target feature that the system means to test. Examples include the virtual target's position, back scattering properties (e.g., radar cross section (RCS)), and velocity, among other things. The RTS then receives a physical (i.e., non-virtual) probe radar signal from the sensor under test. In response, RTS generates and provides back to the test sensor a physical "virtually reflected" waveform, i.e., a signal that mimics the RTS-received probe signal after having been reflected from the virtual target. The test radar sensor then receives and analyzes this virtually reflected waveform. The sensor can, for example, determine whether it has detected the virtual target. If so, the test sensor can determine detected virtual target parameters (e.g., position, distance from sensor). Sensor performance can then be evaluated by comparing the RTS position, distance, etc. of the virtual target with the result detected by the radar sensor's analysis.

In RTS, virtual target movement is typically modeled by adding a Doppler frequency shift to the virtually reflected waveform according to a velocity of the virtual target. In some cases, the Doppler frequency shift can be proportional to the virtual target velocity. However, typically the RTS virtually reflected waveform does not accurately account for effects that would be caused by movement of the virtual target. For example, conventional RTS does not take into account an effect on the virtually reflected waveform of changes in the distance between target and sensor to change over multiple radar test signals or "chirps" caused by the velocity and/or during single chirps/symbols. This position change of the virtual target, called "range migration," can cause a distribution of energy in the received signal range and velocity domain, increasing with increasing virtual target velocity. Failure to interpret the energy distribution correctly can lead to ambiguity or inaccuracy in testing. When that happens, RTS testing can overestimate sensor accuracy and sensitivity/performance. It would be advantageous to develop an RTS system that more accurately models moving targets so that sensors could be more readily assessed in terms of their ability to detect motion.

SUMMARY

The following is a brief summary of subject matter that is described in greater detail herein. This summary is not intended to be limiting as to the scope of the claims.

Disclosed herein may be a radar target simulator (RTS) device including a processor and a memory. The memory stores computer-readable instructions that, when executed by the processor, cause the processor to perform acts including receiving a test sensor probe signal from a test sensor. The acts further include generating a first virtual target for a radar target simulation and transmitting a virtually reflected waveform responsive to the test sensor probe signal for the radar target test simulation, wherein the virtually reflected waveform may be based at least in part on a change in a position of the first virtual target.

The instructions may cause the processor to perform acts including generating the change in position of the first virtual target with respect to a position of the test sensor. The acts may include generating a velocity of the first virtual target. The acts may also include generating the virtually reflected waveform by shifting a phase of the test sensor probe signal by a Doppler correction according to the velocity of the first virtual target and time shifting the test sensor probe signal according to the change in position of the first virtual target.

The virtually reflected waveform may mimic a waveform that would result from reflecting the test sensor probe signal from the first virtual target. The time shifting of the test sensor probe signal may mimic a time shift that would result from the change in the position of the first virtual target. The time shifting may result from transmitting the virtually reflected waveform faster than the test sensor probe signal was received. The time shifting may result from transmitting the virtually reflected waveform slower than the test sensor probe signal was received. The time shifting may be with respect to a common clock signal shared by the test sensor and the RTS device.

The test sensor may have a test sensor clock signal. The RTS device may have an RTS clock signal. The test sensor clock signal may be synchronized with the RTS clock signal and the time shifting may be with respect to the RTS clock signal. The RTS device may have an RTS clock signal. The RTS clock signal may be initialized when the test sensor probe signal is received by the RTS. The time shifting may be with respect to the RTS clock signal.

The mimicking that comprises the time shift that would result from a change in the position of the first virtual target may be performed via digital signal processing. The RTS device may convert the test sensor probe signal to a digital test sensor probe signal, time shift the digital test sensor probe signal to mimic the time shift that would result from a change in the position of the first virtual target, and convert the time shifted digital test sensor probe signal to an analog virtually reflected waveform. The shifting of a phase of the test sensor probe signal may mimic a phase shift that would result from the velocity of the first virtual target. The time shifting may be initiated by detection of the test sensor probe signal. The test sensor probe signal may include a signal that increases in frequency with time.

The computer-readable instructions may cause the processor to perform acts including generating a position of the first virtual target with respect to a position of the test sensor. The acts may include generating a velocity of the first virtual target. They may include generating a second virtual target for the radar target simulation. The acts may include generating a position of the second virtual target with respect to a position of the test sensor. The acts may include generating a velocity of the second virtual target. The acts may include generating the virtually reflected waveform by shifting a phase of the test sensor probe signal by a Doppler correction according to the velocity of the first virtual target and the second virtual target, time shifting the test sensor probe signal according to the position of the first virtual target and the position of the second virtual target, and transmitting the virtually reflected waveform responsive to the test sensor probe signal for the radar target test simulation.

The shifting of the phase of the test sensor probe signal by the Doppler correction may mimic a Doppler shift that would result from the velocity of the first virtual target. The time shifting of the test sensor probe signal may mimic a time shift that would result from the change in the position of the first virtual target and result from transmitting the virtually reflected waveform faster than the test sensor probe signal was received. The time shifting may be initiated by detection of the test sensor probe signal.

Further disclosed herein is a method of simulating a radar target detection. The method includes receiving a test sensor probe signal from a test sensor, generating a first virtual target for a radar target simulation, and transmitting a virtually reflected waveform responsive to the test sensor probe signal for the radar target test simulation, wherein the virtually reflected waveform may be based at least in part on a change in position of the first virtual target.

The method may also include generating the position of the first virtual target with respect to a position of the test sensor. It may include generating a velocity of the first virtual target. It may include generating the virtually reflected waveform by shifting a phase of the test sensor probe signal by a Doppler correction according to the velocity of the first virtual target, and time shifting the test sensor probe signal according to the change in position of the first virtual target to mimic a time shift that would result from the change in the position of the first virtual target and result from transmitting the virtually reflected waveform faster than the test sensor probe signal was received.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF DRAWINGS

FIG. 4A shows an exemplary method 400 for using RTS system 150 to test and evaluate a sensor 160;

FIG. 4B shows an exemplary method 450 for using RTS system 150 to test and evaluate a sensor 160 over a number of cycles.

DETAILED DESCRIPTION

Figure 1:
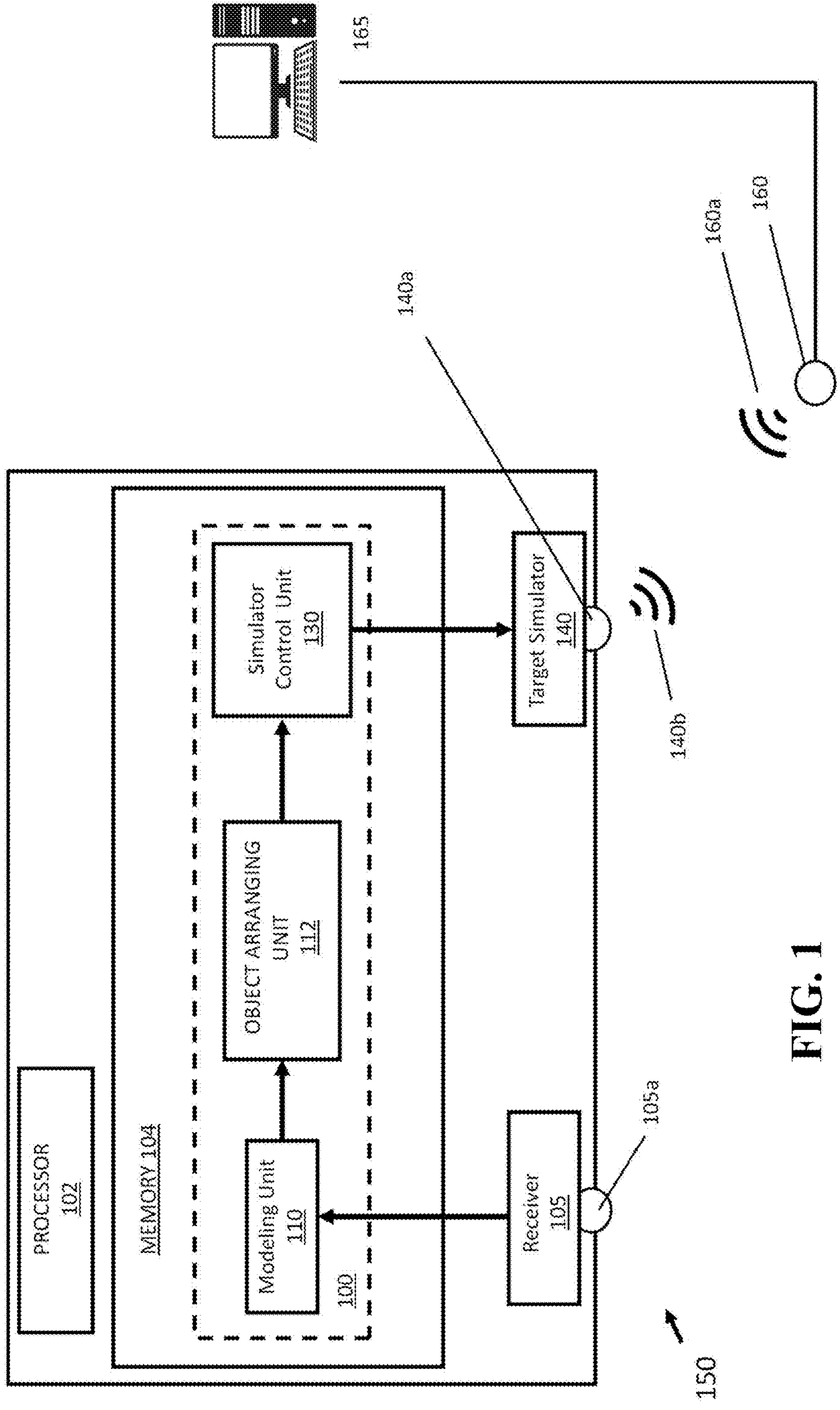
FIG. 1 is a block diagram of a radar target simulator (RTS) system 150 for validating a test sensor 160 according to aspects of the present disclosure.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

Overview of the Disclosed Systems and Methods

Various technologies pertaining to testing radar sensing and navigating systems are disclosed herein with reference to the drawings, wherein like reference numerals are used to refer to like elements throughout. In the following description, for purposes of explanation, numerous specific details are set forth to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component", "system", "module", and "unit" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Radar Target Simulator System 150

FIG. 1 is a block diagram of an exemplary radar target simulator (RTS) system 150 for validating a test sensor 160 according to aspects of the present disclosure. RTS system 150 includes a target information ("TI") system 100 for generating information for a target simulator 140. As discussed in more detail below, target simulator 140 can generate a waveform that mimics reflection of a sensor probe signal from a virtual target ("VT"), which is a simulated radar target. For example, the generated waveform may include a time-shifted virtually reflected waveform 140*b* for testing sensor 160, where the time shift is associated with distance of the VT defined by the TI generated by or input to system 100.

It is to be understood that components in RTS system 150 shown in FIG. 1 may be implemented via software, hardware, or both. In other words, each of the components may exist as a software module stored in memory 104, for example. There may also be hardware implementations of the modules, or those that combine hardware and software. Hardware implementations include both hardware components specifically mentioned in this disclosure and those known in the art that may be omitted. This disclosure is meant to apply to any and all such implementations of RTS system 150.

For example, the target information system 100 may include electronics for signal processing that are not expressly shown in FIG. 1. System 100 may include any suitable number of analog to digital converters (ADCs), digital to analog converters (DACs), digital signal processors, filters, amplifiers, and or DC/AC offsets. These components may be present as part of or be used by the modeling unit 110, object arranging unit 112, or simulator unit 112. In addition, the components may be part of, or communicate with, receiver 105. They may be incorporated into any component in systems 100 and 150, whether expressly shown in FIG. 1 or not.

Sensor 160 and Probe Radar Signal 160*a*

Sensor 160 is the sensor or sensors to be tested by RTS system 150. Sensor 160 may include any suitable hardware for test, including a radar emitter/transmitter and receiver. Sensor 160 also may include suitable signal processing software and hardware, including DACs, ADCs and ASICs for signal processing. Sensor 160 may be connected to computing device 165 for driving radar transmission and detection, among other purposes. Computing device 165 may be a standalone PC or other similar device, an embedded CPU, or other similar hardware. Although FIG. 1 shows computing device 165 as separate from RTS system 150, this need not be the case. In fact, the processor 102 of the RTS system 150 may act as computing system 165 to operate sensor 160.

Although FIG. 1 shows only one test sensor 160, it is to be understood that this is merely exemplary. In practice, RTS system 150 may evaluate one or more test sensors 160 at the same time. Some applications, for example, may require interpretation of detection from multiple sensors (e.g., sensor arrays) at once. The sensors 160 may be arranged in any suitable pattern for testing. For example, they may be arranged as used in the target application (e.g., navigating an autonomous vehicle). Although FIG. 1 shows sensor 160 mounted by itself, sensor or sensors 160 may be mounted, for example, on a portion of a radar detection system or autonomous vehicle where they will be deployed. Other components of the system may be included in testing. In principle, RTS system 150 may generate virtual signals for each of the test sensors 160, i.e., an individualized virtual signal for each sensor 160 based on the sensor's characteristics, including relative position from virtual targets represented by the RTS system 150.

Receiver 105

RTS system 150 may include a receiver 105 with a sensor 105*a* for receiving a probe radar signal 160*a* (and other signals) emitted by the test sensor 160. Receiver 105/105*a* can be any suitable receiver of electromagnetic radiation, including standard radar sensors. Receiver 105 can include, for example, suitable signal processing electronics, such as, but not limited to, ADCs and ASICs for signal processing. Receiver 105 may be configured to receive a signal from a single test sensor 160 or from multiple such sensors at once, as discussed above.

Once receiver 105 receives the probe test signal (or "test signal") 160*a* from sensor 160, it can forward a representation of the received signal 160*a* to the RTS system 100 for analysis. This forwarded representation of signal 160*a* may be a copy of the original test signal emitted by sensor 160 either in analog or digital form. For example, the signal representation may have been converted to digital via ADC, processed via DAC and/or any of the ASICs discussed above. On the other hand, it may be raw data reflecting various aspects of the signal (including, for example, amplitude and phase). In general, the representation of the test signal 160*a* in system 150 can take on any suitable form, analog or digital, that lends itself to analysis and simulation.

Target Simulator 140

The RTS system 150 then processes the probe radar signal 160*a*. In this stage, the system 150 may generate TI for target simulator 140. The target simulator 140 then can emit a virtually reflected waveform 140*b*. The virtually reflected waveform 140*b* mimics the test signal 160*a* after having been reflected by a virtual target defined by the TI. In the case of multiple test sensors 160, multiple virtually reflected waveforms 140*b* may be produced. Each reflected waveform 140*b* may represent a virtually reflected signal from one of the test sensors 160. It is to be understood that the target simulator 140 may simulate as many virtual targets as required for the simulation.

Even though FIG. 1 shows the target simulator 140 and the receiver 105 as separate components, it is to be understood that this is merely for illustrative purposes. Target simulator 140 and the receiver 105 may be combined in a single component. The target simulator 140 can also include a radar emitter/transmitter 140*a*. The radar emitter/transmitter 140*a* can be any suitable device that can emit an electromagnetic waveform according to the target information TI. The target simulator 140 can further include electronics associated with signal processing, including DACs, ADCs, and ASICs. The target simulator 140 can also include computer processors, CPUs, computer memory, etc. The radar emitter/transmitter 140*a* may emit one or more virtually reflected waveforms 140*b*, as discussed above. The one or more virtually reflected may then be detected by the sensor 160 and used by RTS system 150 to determine performance of sensor 160.

As shown in FIG. 1, the target information system 100 may be a module or unit in the RTS system 150. The target information system 100 may generally exist as software located on memory 104 within the RTS system 100. The target information system 100 may include separate modules, units, or components within it, such as any of the DACs, ADCs, or ASICs discussed above. It is to be understood that these modules, units, or components may be provided by software, hardware, or both.

Modelling Unit 110

The target information system 100 may include a modeling unit 110 to assist system 100 in generating TI and further using the generated TI in the RTS simulation. For example, the modeling unit 110 may generate a description of one or more virtual targets to be located within a radar detection range of sensor 160 during testing. More specifically, the modeling unit 110 may generate coordinates representing the positions of virtual objects as well as their velocities or changes in position with time. A user may, for example, specify a list of virtual targets to the system 100 and the modeling unit 110 may generate their initial coordinates and track those coordinates over the course of the simulation. The target simulator 140 may then use the updated coordinates to generate virtually reflected waveforms 140*a* that represent a reflection from one or more of the targets at any given time.

The virtual targets (VTs) may represent any objects of interest for the application. For example, if the application is vehicle navigation, the virtual targets may represent obstacles for the vehicle (e.g., other vehicles, trees, street signs) or objects that assist in vehicle navigation (e.g., curb of road). The positions of the virtual targets with respect to sensor 160 may be determined by the modeling unit 110. Modeling unit 110 may determine other aspects of the virtual targets, including their velocity, size, angular position and RCS, for example.

An object arranging unit 112 of the target information system 100 may receive information concerning the virtual targets from the modeling unit 110. The object arranging unit 112 may coordinate relative motion of the virtual objects according to the target simulator 140. For example, if the virtual objects are moving with respect to each other, the object arranging unit 112 may determine their relative positions over time. This motion may be coordinated on a radar frame by frame basis, i.e., the object arranging unit 112 may determine the positions of the virtual objects at each time the sensor 160 sends probe signal 160*a*.

A simulator control unit 130 of the target information system 100 may receive information from the object arranging unit 112. The received information may include, for example, information concerning the virtual targets generated by the modeling unit 110 and position information of the virtual targets generated by the object arranging unit 112. The simulator control unit 130 may consolidate information received regarding the virtual objects into target information. Here the simulator control unit 130 may add information to the target information regarding how to control the radar emitter/transmitter 140*a* to generate a virtually reflected waveform 140*b* that represents the probe radar signal 160*a* having interacted with the virtual targets.

Subsequently, the simulator control unit 130 may provide the target information to the target simulator 140 to emit the virtually reflected waveform 140*b*. Virtually reflected waveform 140*b* is typically emitted via an emitter 140*a* controlled or operated by the target simulator 140. In variations, the virtually reflected waveform 140*b* is a physical electromagnetic wave, i.e., takes the form of physical electromagnetic radiation emitted by emitter 140*a*.

Once the virtually reflected waveform 140*b* is emitted by the target simulator 140, sensor 160 can detect and receive it. Sensor 160 detects the virtually reflected waveform 140*b* as it would waveform reflected off a real target when the sensor 160 is deployed in its actual application (e.g., a target vehicle or obstruction in the case where sensor 160 is deployed on an autonomous vehicle).

Electronics accompanying sensor 160 and/or in computing device 165 may process the received virtually reflected waveform 140*b*. For example, the electronics and/or computing device 165 may determine a number of detected virtual targets in the virtually reflected waveform 140*b*. These VTs may be set by the simulator control unit 130 or other aspect of system 100, as discussed above.

This processing includes, but is not limited to, down mixing, Fourier transformation, and range compression. Once the virtually reflected waveform 140*b* is processed, e.g., range compressed, it can then be transformed into a plot of range magnitude vs. range. Time shifts of features in the virtually reflected waveform may show up as range shifts in the range compressed data. The range compressed data can then be analyzed to determine a position of the virtual target VT (e.g., by determining a location of a maximum or peak in the range magnitude). The range compressed data may also be used to determine other properties relating the virtual target VT (e.g., velocity).

Each of the VTs may have certain simulation characteristics associated with it and assigned by the system 100. These characteristics (e.g., velocity, position, RCS, size, shape, etc.) may be detected by analyzing the virtually reflected waveform 140*b*. The electronics and/or computing device 165 may, for example, determine a number of properties of the virtual targets detected in the virtually reflected waveform 140*b*. The electronics and/or computing device 165 may then communicate with the target information system 100 to determine an accuracy of the sensor 160 detection by comparing known quantities in the target information against their detected counterparts (e.g., by comparing a detected target position, velocity or RCS against the corresponding target position, velocity or RCS in the target information).

Target Information (TI)

Target information (TI) may include any information representing a virtual target (VT) in the RTS simulation. It is to be understood that a target in this context is a VT represented by the RTS system 150 for testing various aspects of sensor 160. The VT may represent any object that sensor 160 may encounter in actual operation. For example, if sensor 160 is to be deployed in an autonomous vehicle, the VT may represent objects the vehicle may encounter in operation. Examples include other vehicles, walls, fences, curbs, trees, etc. It is not necessary for a VT to represent a specific object related to the operation of sensor 160. For example, the VT may represent a generic object of interest in the field of view of sensor 160 to test its detection. A VT may have aspects (e.g., size, position, velocity, shape) that are specifically designed to test capabilities of sensor 160. The aspects of the VT need not be a realistic representation of any object that the sensor 160 may encounter in deployment.

TI may represent the VT as a single geometric location (e.g., a mathematical point on a coordinate grid). On the other hand, a VT may be represented as having a spatial distribution. For example, the TI may describe a VT with a one dimensional, two dimensional, or three dimensional size or spatial extent. In principle, the TI may describe VTs with simple or complex shapes. It may describe VTs that are monolithic, contiguous, or have discreet parts of portions. For the purposes of this disclosure, all such potential targets are considered. It is to be understood that the particular form of the virtual targets may depend on the application for sensor 160 (i.e., the application for which sensor 160 is being tested, evaluated, or calibrated). Moreover, although some parts of this disclosure address the case of a single VT, it is to be understood that multiple targets are possible and should be considered within the extent of the present disclosure. In some applications, it may be advantageous to test the ability of sensor 160 to detect multiple targets at once. It may also be advantageous, in some applications, for the RTS system 150 to model several targets at once. TI may, for example, include a position or location of a target and a velocity.

Position information in TI may be encoded in terms of a coordinate system that gives a position of the target with respect to sensor 160, for example. The position can be chosen by the user or the RTS system 150 or coded into a preset simulation. The preset simulation may be read or decoded by the RTS system 150. The RTS system 150 may also be used to test sensor 160 in specific situations that require a condition or distance between the VT and the sensor 160. For example, the RTS may be used to test sensor 160 under the condition when the VT is close enough to sensor 160 and moving quickly enough to collide with sensor 160 in a relatively short period of time. Such a test may be used to gauge the performance of sensor 160 under challenging conditions.

Velocity of the VT may be included in the TI. Virtual target velocity ("V") can be represented as a frequency (or Doppler) shift of the test probe signal. For example, V can be represented as a velocity relative to sensor 160, relative to one or more virtual targets, or relative to the coordinate system mapping the virtual test area represented by system 150. In this case, V may be stored in the form of a Doppler shift to be applied to the probe radar signal 160*a* to generate a virtually reflected waveform 140*b* that represents the velocity of the target. This and other applications will be explored in more detail below.

RTS System 150 Implementation

In one exemplary implementation, RTS system 150 simulates a Frequency-modulated continuous-wave radar (FMCR or FMCW) system, such as may be employed in an autonomous vehicle. The setup may resemble that shown in FIG. 1 where sensor 160 (or array of sensors 160) represents the actual FMCR system and the RTS system 150 simulates the targets of the system. In this configuration, the RTS system 150 can be used to test and evaluate performance of sensor 160 for use in FMCR. Sensor 160 may be for mounting on and navigating an autonomous vehicle, for example.

Test Operation

Figure 2A:
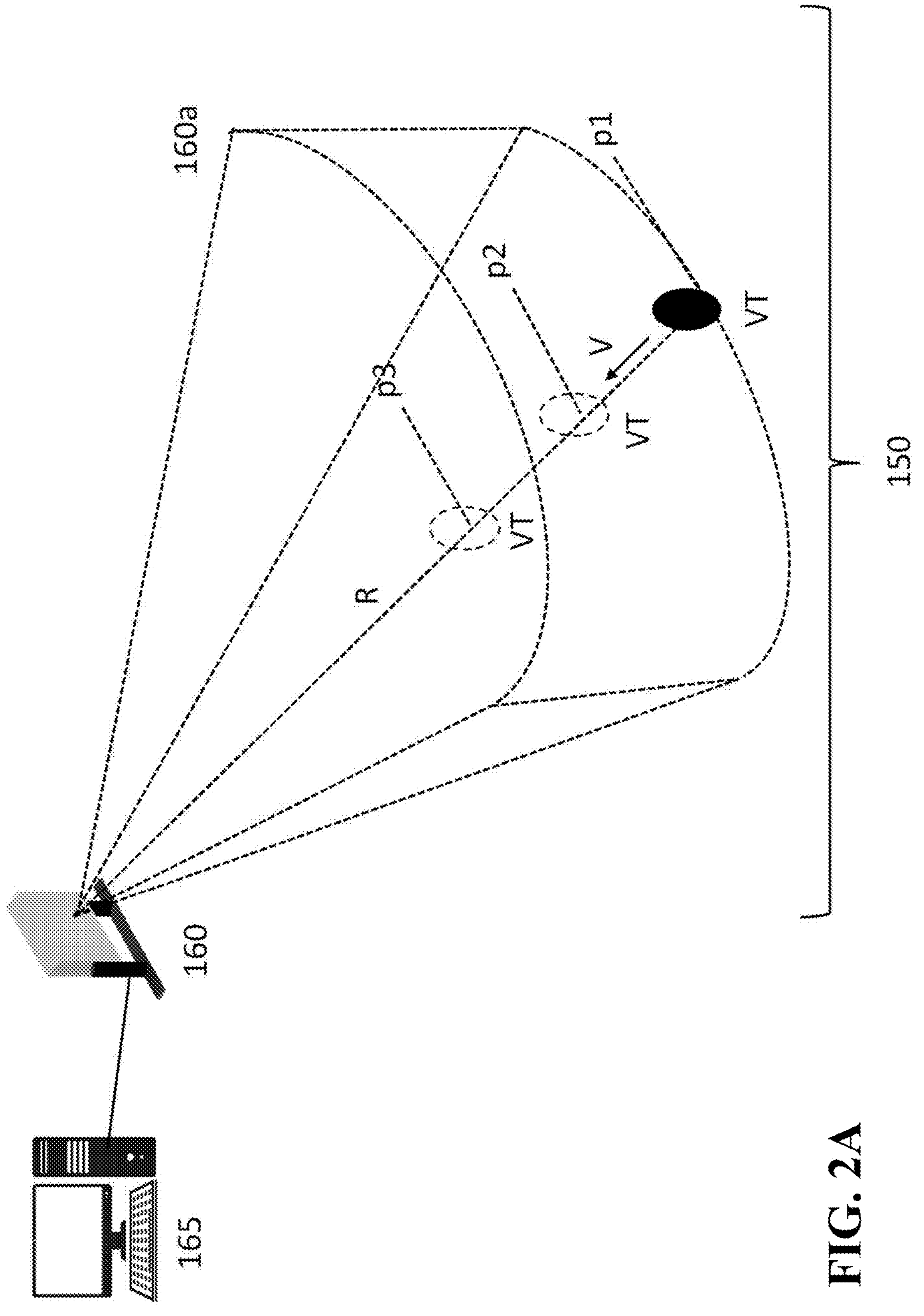
FIG. 2A shows deployment of an RTS system 150 to test sensor 160.

FIG. 2A shows a schematic of a simulated virtual reflection in the RTS system 150. As shown in FIG. 2A, sensor 160 sends a test signal 160*a* into RTS system 150. In variations, the test signal 160*a* is an actual, physical electromagnetic signal sent from an emitter accompanying sensor 160. This test signal 160*a* can be detected by receiver 105. Once detected, the test signal 160*a* can be represented virtually in the RTS system 150 simulation by target information generation system 100, as shown schematically in FIG. 2A. As discussed in more detail below, representation of the test signal 160*a* can be either analog or digital.

In FMCR systems and other systems being tested via RTS system 150, test signal 160*a* may take on a number of forms. One exemplary form is a "chirp" signal in which the signal frequency periodically increases (e.g., linearly) with time. Chirp signals have a number of advantages for FMCR applications that are well known in the art and beyond the scope of this disclosure. In particular, analysis of reflected chirp signals can be advantageously used for relatively short distances between sensor 160 and virtual target VT, can have higher spatial resolution for a frequency change rate, and can enable real-time tracking of virtual targets VTs. Although a chirp test signal 160*a* will be discussed in the examples that follow, it is to be understood that this disclosure encompasses any suitable form of FMCR, including single frequency FMCR and other waveforms (e.g., Pulse-Modulated Continuous Wave (PMCW) or Orthogonal Division Frequency Multiplexing (ODFM)).

It is to be understood that the portion of FIG. 2A labeled 150 corresponds to a simulated environment generated and run by the RTS system 150. That is, the portion of FIG. 2A designated 150 does not represent an actual physical system. Rather 150 as shown in FIG. 2A is a virtual environment simulated by the RTS system 150 including virtual target VT. This is true even though sensor 160 is typically a physical object that sends out test signal 160*a*, which is a physical signal comprising electromagnetic radiation. That said, in some implementations, sensor 160 and probe signal 160*a* may also be virtual or simulated.

The virtual environment described by system 150 includes at least one virtual target VT shown in FIG. 2A, a simulated target whose interaction with test signal 160*a* will be simulated by the RTS system 150. RTS system 150 generally maps this simulated environment via a suitable coordinate system (e.g., a grid) that is not expressly shown in FIG. 2A. The coordinate system used by RTS system 150 to map VT and its environment may be any suitable coordinate system for representing a series of positions of virtual target VT.

One of the purposes of the RTS system 150 is to generate a signal to send back to sensor 160 in response to test signal 160*a*. The signal sent back to sensor 160 by the RTS system 150 represents a reflection of test signal 160*a* from virtual target VT and is generally referred to herein as a "virtually reflected waveform." Once the sensor 160 receives and analyzes the virtually reflected waveform, sensor 160 or system 165 may generate information that it derives from the analysis. This mimics the function of sensor 160 when used to detect objects as deployed on, for example, an autonomous vehicle. The information generated by sensor system 160/165 in response to the virtually reflected waveform can then be compared against the virtual target VT information TI to evaluate performance of sensor 160. Subsequently, the RTS system 150 can evaluate the ability of sensor 160 to detect virtual object VT based using the virtually reflected waveform.

FIG. 2A shows virtual target VT an initial position p1. Note that, in FIG. 2A, virtual target VT has an oval shape that is merely for illustrative purposes. The shape of VT in FIG. 2A is not meant to be exemplary or limiting. It is to be understood that virtual target VT can take on a number of shapes, as described above. It is also possible for virtual target VT to change shape during the simulation.

In the example shown in FIG. 2A, VT is moving at velocity V along direction R. As discussed above, the TI for VT may include a velocity V. The TI may further include various positions of VT at various times (e.g., p1, p2, and p3 at t1, t2, and 3, respectively). FIG. 2A shows two additional positions p2 and p3 reached by VT in the simulation after having moved in this way from position p1 during the simulation. Positions p1 and p2 correspond to the position of VT at times t1 and t2, respectively after it has moved according to velocity V. For the sake of convenience, direction of motion R is coincident with radial axis from sensor 160 in FIG. 2A. It is to be understood that this configuration is merely for illustration. In the RTS system 150 simulation, virtual target VT may, in principle, move in any direction including those that are not along a radial axis R. Although analysis is more complicated when movement is not along direction R, the concepts employed in this case are well known in the art and encompassed within the scope of the present disclosure.

Schematic Representation of RTS Simulated Environment

Figure 2B:
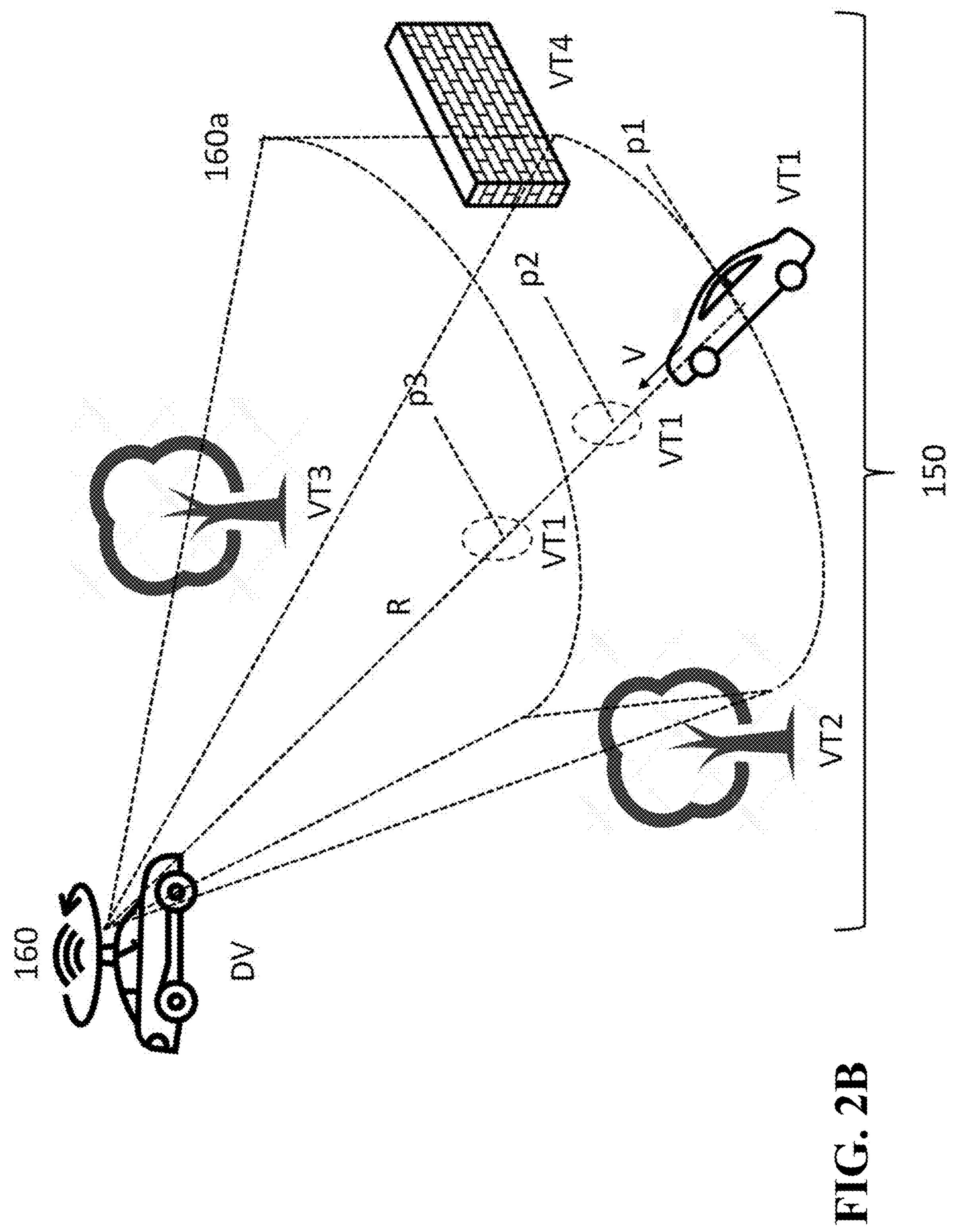
FIG. 2B shows deployment of an RTS system 150 to test sensor 160 in terms of a schematic representation of an environment which might be simulated by RTS system 150.

FIG. 2B shows deployment of an RTS system 150 to test sensor 160 in terms of a schematic representation of an environment which might be simulated by RTS system 150. In FIG. 2B, sensor 160 is mounted onto a vehicle DV as part of an autonomous vehicle navigation system. Vehicle DV would further include electronics 165 for interfacing with sensor 160 and, potentially for driving vehicle DV. This setup would represent actual deployment of sensor 160 for its intended application. One purpose of RTS system 150 is to simulate the configuration shown in FIG. 2B as realistically as possible to test and evaluate sensor 160 for this application.

FIG. 2B replaces virtual target VT (FIG. 2A) with automobile virtual target VT1. As shown in FIG. 2B, there are several additional virtual targets VT not shown in FIG. 2A. These include two trees (virtual targets VT2 and VT3) and brick wall (VT4). As discussed above, these additional virtual targets VT2, VT3, and VT4 may be included in the simulations such that they alter the virtually reflected waveform received and analyzed by sensor 160.

Simulation Process

Figure 3A:
FIG. 3A shows a transmitted signal 305*a* generated by sensor 160 that travels to RTS system 150, the baseband spectrum 305*b*, and a received signal 305*c* (data is simulated, not actual)

FIG. 3A shows the frequency of an exemplary transmitted signal 305*a* generated by sensor 160 vs. time and relative to the baseband spectrum 305*b*. Transmitted signal 305*a* travels from sensor 160 to RTS system 150 and undergoes a time delay with respect to received signal 305*c*, as shown in FIG. 3A. 305*a* is a "chirp," or a linear frequency modulated (LFM) signal characterized by its continuous change in frequency over time, creating a signal that sweeps through a range of frequencies in a linear fashion. In FIG. 3A, signal 305*a* represents a test signal 160*a* as it is transmitted by sensor 160 and before it is received by receiver 105 of RTS system 150. Signal 305*c* may include a virtually reflected waveform 140*b* generated by RTS system 150.

Signal 305*a* is received by receiver 105 and subsequently processed by system 100. For example, system 100 may digitize signal 305*a* so that it may be processed via digital signal processing. This processing may include assessing both the amplitude and phase. Amplitude and phase can then be used by system 100 to determine the virtually reflected waveform 140*b*, represented in FIG. 3A as received signal 305*c*.

Once test signal 305*a* is received and processed as discussed above, RTS system 150 uses the target information TI associated with virtual target VT (and any other virtual targets in the simulation, as described above) to generate and transmit a virtually reflected waveform 140*b* (not shown). To determine the virtually reflected waveform 140*b*, system 100 obtains TI for at least one VT. In some implementations, system 100 may obtain the TI from memory. In others, system 100 may generate the TI from simulation parameters input by a user or provided from some other external source (e.g., downloaded from an external server). System 100 then alters the digitized transmitted waveform 305*a* according to the TI, e.g., to simulate the waveform 305*a* having been reflected from the VT. As discussed above, this alteration may be according to a virtual reflection from one or more VTs. Alteration may be performed via digital or analog signal processing.

For example, the form of the virtually reflected waveform 140*b* can be generated mathematically by RTS system 150 to mimic, estimate, or reproduce a waveform that would result from the test signal 305*a* being physically reflected from an actual physical manifestation of virtual target VT. That is, virtually reflected waveform 140*b* is a simulated waveform that would result from performing the test shown in FIG. 2A in real space. The precise manner in which RTS system 150 may calculate the mathematical representation of waveform 140*b*, other than the specific steps described below, may vary within the context of this disclosure.

Conventional RTS: No Range Changes

Figure 3B:
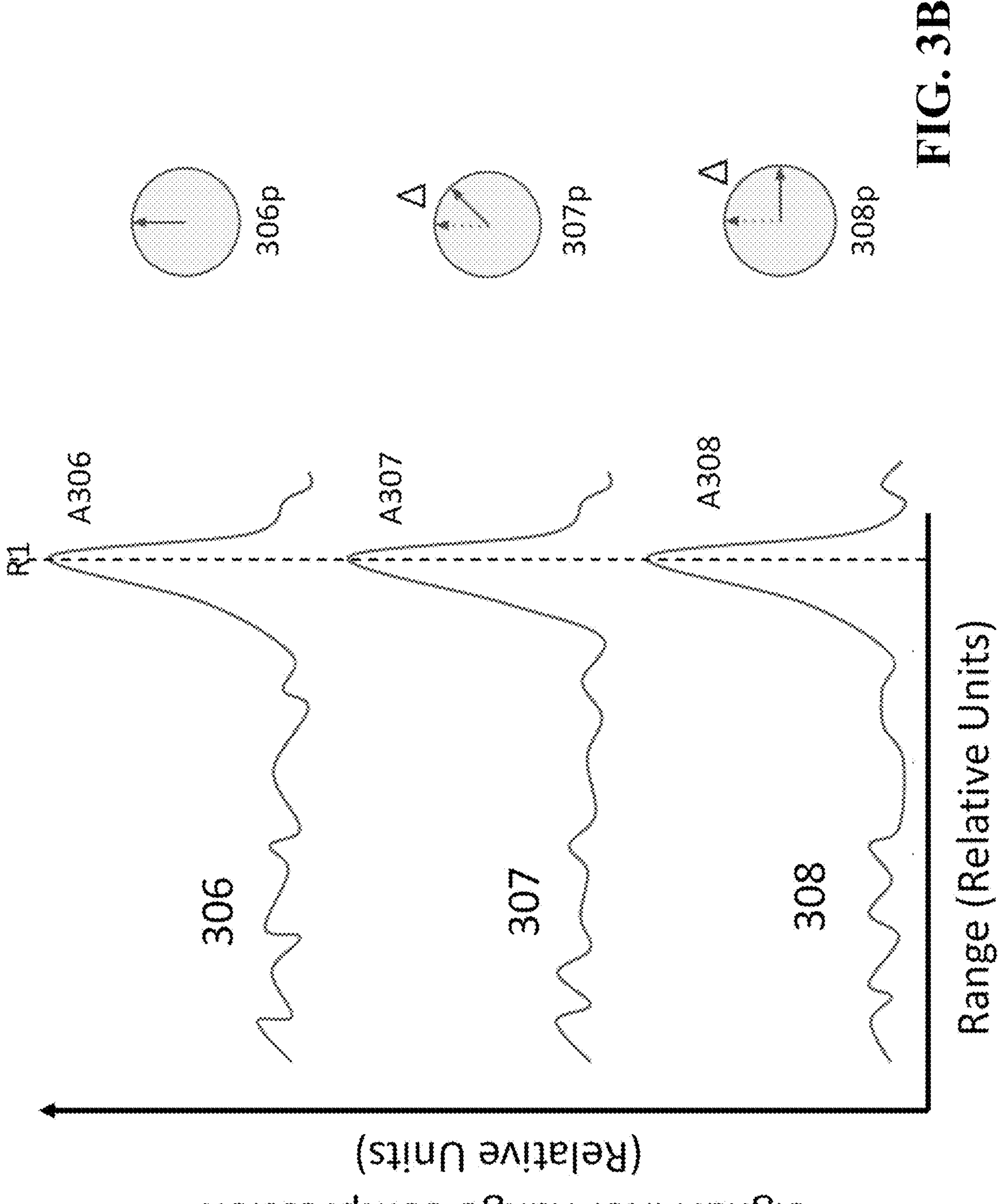
FIG. 3B shows range compressed signals 306, 307, and 308 (data is simulated, not actual) processed from virtually reflected signals generated using a conventional RTS system for multiple chirps, where the virtually reflected signals do not take into account range changes.

FIG. 3B shows a series of range compressed data 306-308 generated from virtually reflected waveforms 140*b* received by sensor 160 in a conventional RTS configuration. We note that the data shown in FIG. 3B, as with other range compressed data shown herein, is not actual or real data. Rather the range compressed data shown here has been generated merely to illustrate the concepts discussed herein. This disclosure can be used with any of the waveforms or types of signals described herein, as well as other similar waveforms or types of signals. The discussion herein should not be considered as limited to any expressly depicted or represented waveform or expressly depicted or represented data.

Processed signals 306, 307, and 308 represent processed received data from three successive chirps of signal 305*a* as the conventional RTS represents a moving virtual target VT. In other words, signal 306 represents received, range uncompressed data from a virtual waveform 140*b*-chirp1 generated by the conventional RTS system in response to a first chirp (chirp1). Signal 307 represents the same in response to a virtual waveform 140*b*-chirp2 from a later, second chirp (chirp2) sent after chirp1. Signal 308 represents uncompressed data from a waveform 140*b*-chirp3 generated in response to a still later third chirp3 sent after chirp2. Since the conventional RTS is representing the virtual target VT as moving, phases 306*p*, 307*p*, and 308*p* are different. The differences represent Doppler shifts according to the movement of virtual target VT.

More particularly, signal 306's phase 306*p* corresponds to a velocity V1 of virtual target VT at a time that chirp1 is reflected. That is, the conventional RTS has altered the phase of the received signal (i.e., phase of signal 305*a*) to mimic that signal having been reflected by VT moving at velocity V1 (e.g., the movement from p1 to p3 shown in FIG. 2A). To do this, system 100 can create a Doppler shift of the phase 310*p* of the virtually reflected waveform 140*b* from that of the phase of the transmitted signal. As discussed above, this is a representation of the reflection from a virtual target VT in motion. FIG. 3B shows this phase shift represented by the difference in phase A between the phase of transmitted signal 305*a* and phase 306*p* of signal 306. The phase difference A should represent the Doppler shift created by movement of virtual target T along R, as shown in FIG. 2A.

In some instances, for example, A can be proportional to a radial velocity of the virtual target (e.g., V of VT shown in FIG. 2A). As used herein, "radial velocity" denotes a movement in the direction of the source of probing radiation, i.e., direction R in FIG. 2A. Here, the direction of a radial velocity of a virtual target is when the virtual target is moving towards the test sensor 160. In other instances, A may be another function of the velocity of the virtual target.

Conventional RTS systems represent a virtual target only via a shift in phase or Doppler shift in the returned signals, as described above. This does not incorporate the change in range of the virtual target VT that, in physical reality, must accompany its movement. This is why, as shown in FIG. 3B, the peak magnitudes A306, A307, and A308 for signals 306,

307, and 308 all occur around the same range R1. In contrast, if the target and sensor were part of a real physical system in which the target was actually changing position or range during the three chirps, each peak magnitude A306, A307, and A308 would occur at a different range corresponding to the different positions of the target during each of the three chirps. In this way, omitting position from the analysis may not realistically represent a moving VT.

Testing only the ability of sensor 160 to determine or detect the velocity component from the phase shift can overestimate sensor 160's accuracy or sensitivity. This is because the test does not include the convolution of velocity and position information that can make accurate testing and assessment more complicated and difficult.

Phase Shift and Range Migration

RTS system 150 can address this problem by creating TI that represents both changes in velocity and range. RTS system 150 can then use this information to generate a virtual waveform 140*b* that represents virtual target VT's changes in position (e.g., from p1 to p3 in FIG. 2A) and velocity, as well as other variables. As discussed above, both the velocity and position changes are useful to test the accuracy and/or sensitivity of sensor 160 for many applications, including for navigating autonomous vehicles.

Figure 3C:
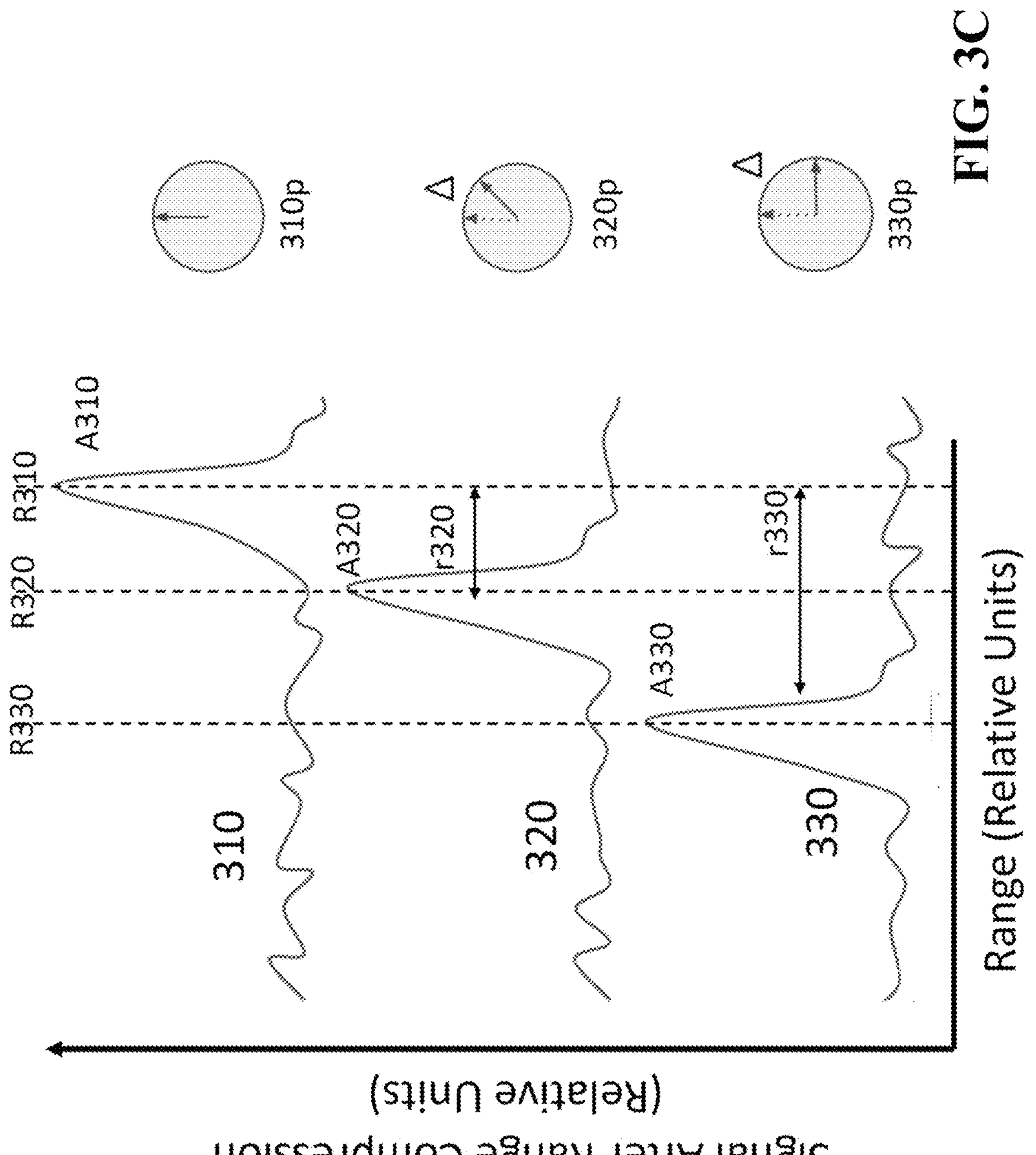
FIG. 3C shows range compressed signals 310, 320, and 330 (data is simulated, not actual) processed from virtually reflected signals generated using a the RTS system disclosed herein for multiple chirps, where the virtually reflected signals take into account range changes.

FIG. 3C shows a range comparison of several range compressed signals acquired by sensor 160 from waveforms having been created by RTS system 150 over time. Signal 310 was created with phase 310*p*. Any shift in frequency or phase of 310*p* represents a velocity V1 of the virtual target VT shown in FIG. 2A along radial distance R. Signals 320 and 330 include Doppler shifts caused by the movement of virtual target VT. As in the case of phases 306*p*, and 308*p*, discussed above, phases 310*p*, 320*p*, and 330*p* in FIG. 3C are meant to symbolically show differences in phase shift. They are not meant to provide quantitative measures of actual phase shifts.

As shown in FIG. 3C, phases 310*p*, 320*p*, and 330*p* are different and peak magnitudes A310, A320, and A330 occur at different ranges. For example, peak A320 is shifted in range (r320) with respect to peak A310. This is because the virtually reflected waveforms used to create this data were generated when the virtual target VT had different positions and/or velocities. These range shifts are discussed in more detail below.

More specifically, RTS system 150 has time-delayed signal 320 in range (r320) with respect to signals 306 and 310 to account for the "range migration" effect caused by virtual target VT moving from positions p1 to p2 (FIG. 2A) during the simulation. Phase 320*p* includes a Doppler shift Δ, as well as this change in range. FIG. 3C shows how signal 320 differs from signal 307 (FIG. 3B) generated by the conventional RTS for the same conditions. Signal 320 includes the range shift r320 corresponding to the change in position of VT from p1 to p2 along direction R (FIG. 2A). For reasons discussed above with respect to conventional RTS, signal 307 does not take this position change from p1 to p2 into account. Since both are part of a simulation created by RTS system 150, signal 320 can be considered a more accurate representation of a reflection from moving virtual target VT. This is because, although waveform 307 is meant to represent a reflection from the same virtual target VT under the same conditions, it leaves out this information.

Similarly, FIG. 3C also shows another signal 330 that represents still another positional change of virtual target VT. Signal 330 takes into account the positional change of virtual target VT from p1 to p3 (FIG. 2A). The corresponding range shift is r330, greater than the corresponding range shift r320. That is, peak magnitude A330 of signal 330 is shifted by r330 closer in range to sensor 160 than peak magnitude A320 of signal 320. This corresponds to movement of virtual target VT closer to sensor 160 along direction R from p1 to p3, as opposed to from p1 to p2 (as in the case of signal 320). Comparison with data 308 generated from a virtually reflected waveform created via conventional RTS (i.e., not accounting for the positional change of virtual target VT) under these same conditions shows the difference.

FIG. 3C shows a corresponding new phase 330*p* of signal 330 that is different from the phases of the previous signals (310*p* and 320*p*). This relates to the difference in Doppler and range shifts from r330 and r320. In this way, each of virtually reflected range compressed signals 320 and 330 take into account both Doppler phase shift A corresponding to velocity V of virtual target VT and a range shift corresponding to the respective positional change of virtual target VT during the RTS system 150 measurement.

Creating Time Shifts and Range Shifts (e.g., r320 and r330)

Range shifts r320 and r330 can be created by RTS system 150 in a number of ways. These ways generally correspond to either digital or analog manipulation of test signal 305*a* to produce virtually reflected waves 140*b* used to generate signals 320 or 330 (or other examples not explicitly discussed in this disclosure). One of the primary methods is time shifting the virtually reflected waveforms 140*b* to yield range shifts in the resulting range compressed data.

In one example, RTS 150 can digitize the test signal 305*a*, for example, using hardware discussed above. A digitized test signal 305*a* can then be time shifted by simply mathematically shifting a time associated with each data point (i.e., each time resolved amplitude in the signal 305*a*). The digitization or digital processing may include downmixing the signal or mixing with other signals. The time shift can be predetermined or generated in real time associated with the target information TI from the virtual target VT. Once the digital signal is obtained, it can be re-sent as the time-shifted virtually reflected waveform 140*b* by sending the signal back to sensor 160 faster or slower than it was received. The virtually reflected waveform 140*b* can then be range compressed to provide range magnitude vs. range data (e.g., in FIGS. 3B and 3C). Range shifts in peak magnitudes in this range compressed data correspond to the time shifts in the virtually reflected waveform 140*b*.

Analog Time/Range Shifting

On the other hand, test signal 305*a* can be manipulated as an analog signal. In this case, the phase and times shifts can be created by filtering. In particular, the signal can be stored, then re-transmitted as a virtually reflected waveform 140*b* with a delay that produces the proper time shift. Time shifts can also be produced by mixing the test signal 160*a* with other analog signals. These time shifts can correspond to range shifts in range compressed data.

Synchronization Between Sensor 160 and RTS System 150

Creating correct time/range shifts (e.g., r320 and r330) mentioned above can be accomplished by establishing synchronization between sensor 160 (and associated electronics 165) and the RTS system 150. In particular, establishing a shared clock between sensor 160 and system 150 can create a mutually understood time frame allowing manipulation of signal time frame, as discussed above. This shared clock can be established in a number of different ways in the context of the instant disclosure.

In one example, a shared clock can be created in advance that governs the timing of both sensor 160 (and electronics 165) and system 150. This can be a physical clock located either within electronics 165 or system 150. Alternatively, a physical clock that is external to both systems can be established (e.g., on a remote server or other system to which both sensor 160 and system 150 have access). In addition, timing can be synchronized between sensor 160 and system 150 via a software connection.

In another example, a clock in the RTS system 150 can be triggered by an external source. For example, the clock in the RTS system 150 can be triggered by a chirp from test signal 305*a*. This signal may initiate a clock already embedded in RTS system 150, or one that is externally connected to the RTS system 150. This RTS system 150 clock need not provide system-wide timing. It may, instead, be an isolated clock simply for the purposes of signal detection and manipulation.

Exemplary Simulation Method 400

FIG. 4A shows an exemplary method 400 for using RTS system 150 to test and evaluate a sensor 160. Although FIG. 4A shows a sequence of steps, it is to be understood that this presentation is not limiting. When appropriate, steps shown in method 400 may be taken in a different order in accordance with this disclosure.

In step 402, the receiver 105 of the RTS system 150 receives the test signal 160*a* from sensor 160 undergoing test. As discussed above, in this step the RTS system 150 and system 100 may process the received signal 160*a* any number of ways to analyze it and use it to generate a virtually reflected waveform 140*b*. For example, as discussed above, RTS system 150 may digitize the received signal 160*a* and store the digitized received signal 160*a* in memory 104 for analysis or manipulation. RTS system 150 may alternatively store the test signal 160*a* as an analog signal for analog processing.

In step 404, RTS system 150 selects virtual targets VT for the simulation. The virtual targets VT may be provided to RTS system 150 in a number of different ways. For example, a user may input the VTs and their target information TI directly to the RTS system 150. Alternatively, RTS system 150 may generate VTs and their corresponding TI from other user input (e.g., the user may input the identities of objects to the system, such as a vehicle VT1, trees VT2 and VT3, and wall VT4 and allow the RTS system 150 to place the virtual targets in the simulation).

In step 406, the RTS system 150 generates or stores target information TI for each of the virtual targets selected in step 404. For example, the RTS system 150 may store velocity V and position p information for each of the VTs. RTS system 150 may store other quantities associated with the VTs at this stage, including their dimensions, etc. Each of these quantities may be read by the RTS system 150 from another source (e.g., a server, memory, or user input) or generated by the RTS system 150 from the information available to it.

In steps 408 and 410, the RTS system 150 generates parameters necessary for creating the virtually reflected waveform 140*b* from the test signal 160*a* and the VT TI. For example, the RTS system 150 may generate a time delay and stretched or compressed signal which has a Doppler phase shift A (step 408) according to the velocity V of one or more VTs at this stage. RTS system 150 may also generate a time shift t (step 410) for the virtually reflected signal 140*b* (from the timing of the test signal 160*a*) based on the position information p of one or more of the VTs. This time shift would ultimately be converted to a range shift (e.g., range shifts r320 or r330 in FIG. 3C) after the virtually reflected signal 140*b* is range compressed. These parameters may be calculated or determined by any suitable means disclosed herein or equivalent, including by digital signal processing or analog signal processing (e.g., filtering, etc.).

In step 412, the RTS system 150 outputs a virtually reflected waveform 140*b* that has the characteristics determined in step 408. The virtually reflected waveform 140*b* is output via target simulator 140 and sent in the direction of sensor 160.

Exemplary Simulation Method 450

FIG. 4B shows an exemplary method 450 for using RTS system 150 to test and evaluate a sensor 160 throughout a series of cycles or frames. Specifically, the method 450 utilizes method 400 to determine accuracy of sensor 160 over multiple test signals 160*a*. This test can include evaluating accuracy of sensor 160 in determining time evolution of virtual target VT properties (e.g., velocity V and position p) over multiple frames. Although FIG. 4B shows a sequence of steps, it is to be understood that this presentation is not limiting. When appropriate, steps shown in method 450 may be taken in a different order in accordance with this disclosure.

In step 451, system 150 initiates the test. This step may include powering and starting the RTS system 150. In any case, the RTS system 150 should be ready to receive test signal 160*a* in this step via receiver 105.

In step 452, sensor 160 sends test signal 160*a* so that RTS system 150 may receive it. RTS system may store the test signal 160*a* at this step according to any of the methods described herein.

In step 453, the RTS system 150 uses the test signal received in step 452 to perform method 400 described in FIG. 4A. That is, system 150 generates a virtually reflected waveform 140*b* by estimating a reflective interaction between the virtual targets VTs in an RTS simulation and the as-received target signal 160*a*. At the end of step 453, the virtually reflected waveform 140*b* is output back to sensor 160 according to this process.

In step 454, the virtually reflected signal 140*b* has been received by sensor 160. Sensor 160 and sensor electronics 165 then analyze the virtually reflected signal 140*b* against the target signal 160*a* to determine the reflective influence of the VTs. In this step, a number and identity of the VTs may be estimated. Properties of the individual VTs (e.g., velocity V and position p) may also be estimated.

In step 455, the RTS system 150 compares the estimates of TI generated by the sensor electronics 165 in step 454 against the known TI for each VT. RTS system 150 then uses this comparison to provide an estimate of the accuracy of sensor 160.

In step 456, the RTS system 150 determines whether the test should continue (e.g., if sensor 160 is still sending test signals 160*a*). If not, the test is concluded in step 457. If the test should continue, the method 450 cycles back to step 452 to acquire another test signal 160*a* for analysis.

Exemplary Computing Device 500

Figure 5:
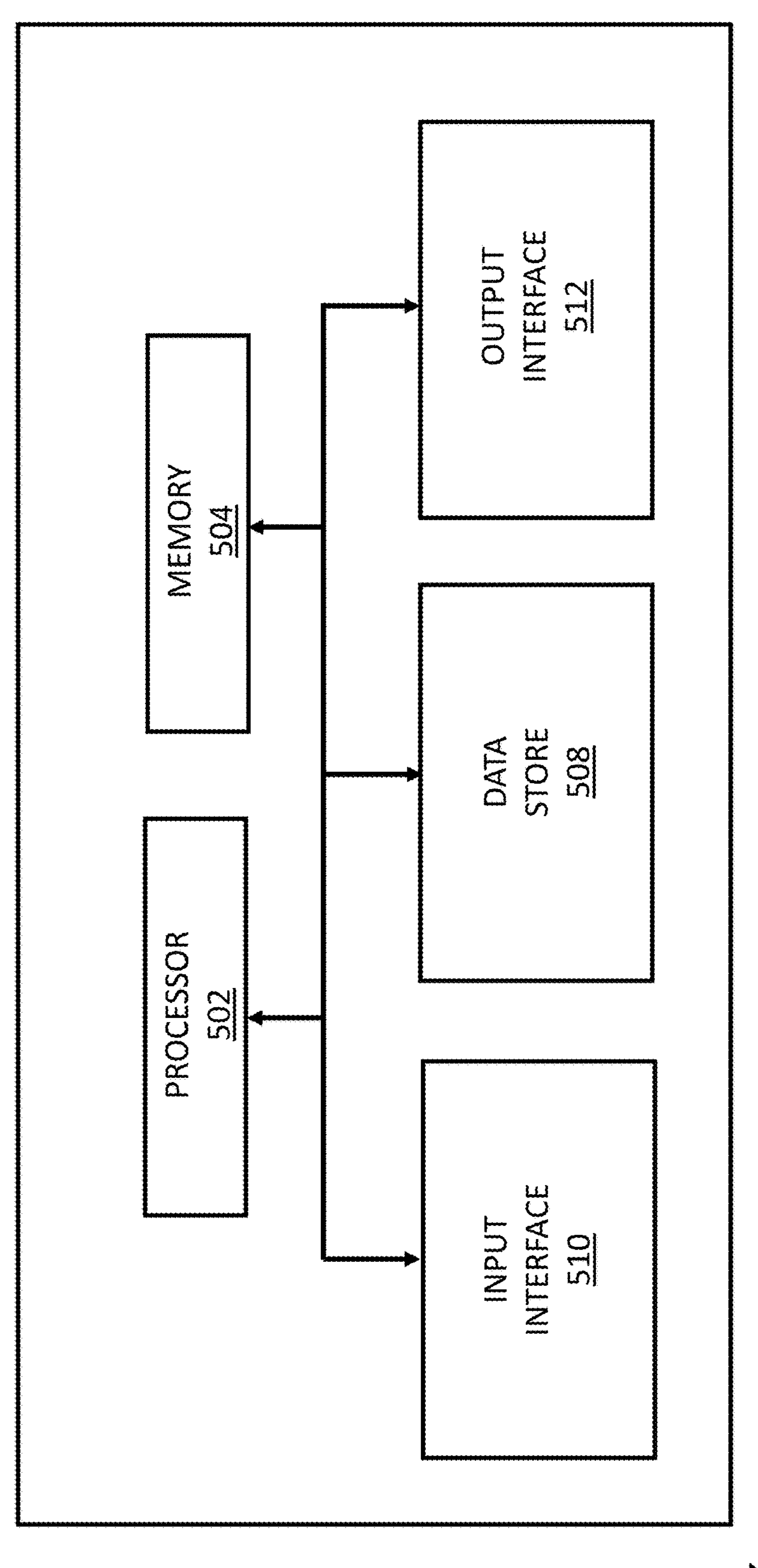
FIG. 5 presents a high-level illustration of an exemplary computing device 500 that can be used in accordance with the systems and methodologies disclosed herein.

FIG. 5 presents a high-level illustration of an exemplary computing device 500 that can be used in accordance with the systems and methodologies disclosed herein. Specifically, computing device 500 may accompany sensor 160, sensor electronics 165, and/or RTS system 150.

Computing device 500 includes at least one processor 502 that executes instructions that are stored in a memory 504. The instructions may be, for instance, instructions for implementing functionality described as being carried out by one or more systems discussed above or instructions for implementing one or more of the methods described above. The processor 502 may be a graphics processing unit (GPU), a plurality of GPUs, a central processing unit (CPU), a plurality of CPUs, a multi-core processor, etc. The processor 502 may access the memory 504 by way of a system bus 506. In addition to storing executable instructions, the memory 504 may also store computer-implemented machine learning models, sensor data, labeled sensor data, mapping data, weighted directed graphs, etc.

The computing device 500 additionally includes a data store 508 that is accessible by the processor 502 by way of the system bus 506. The data store 508 may include executable instructions, computer-implemented machine learning applications, sensor data, labeled sensor data, mapping data, weighted directed graphs, etc. The computing device 500 also includes an input interface 510 that allows external devices to communicate with the computing device 500. For instance, the input interface 510 may be used to receive instructions from an external computer device, etc. The computing device 500 also includes an output interface 512 that interfaces the computing device 500 with one or more external devices. For example, the computing device 500 may transmit control signals to a vehicle propulsion system, the braking system, and/or the steering system (not shown) by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a radar target simulator (RTS) device is described herein. The RTS device includes a processor and memory that stores computer-readable instructions that, when executed by the processor, cause the processor to perform acts. The acts include receiving a test sensor probe signal from a test sensor. The acts also include generating a first virtual target for a radar target simulation. Moreover, the acts include transmitting a virtually reflected waveform responsive to the test sensor probe signal for the radar target test simulation, wherein the virtually reflected waveform is based at least in part on a change in a position of the first virtual target.

(A2) In some embodiments of the RTS device of (A1), the instructions cause the processor to perform acts including generating the change in position of the first virtual target with respect to a position of the test sensor; generating a velocity of the first virtual target; generating the virtually reflected waveform by: shifting a phase of the test sensor probe signal by a Doppler correction according to the velocity of the first virtual target; and time shifting the test sensor probe signal according to the change in position of the first virtual target.

(A3) In some embodiments of the RTS device of (A2), the virtually reflected waveform mimics a waveform that would result from reflecting the test sensor probe signal from the first virtual target.

(A4) In some embodiments of the RTS device of (A2), the time shifting of the test sensor probe signal mimics a time shift that would result from the change in the position of the first virtual target.

(A5) In some embodiments of the RTS device of (A4), the time shifting results from transmitting the virtually reflected waveform faster than the test sensor probe signal was received.

(A6) In some embodiments of the RTS device of (A4), the time shifting results from transmitting the virtually reflected waveform slower than the test sensor probe signal was received.

(A7) In some embodiments of at least one of the RTS devices of (A4)-(A6), the time shifting is with respect to a common clock signal shared by the test sensor and the RTS device.

(A8) In some embodiments of at least one of the RTS devices of (A4)-(A7), the test sensor has a test sensor clock signal; the RTS device has an RTS clock signal; the test sensor clock signal is synchronized with the RTS clock signal; and the time shifting is with respect to the RTS clock signal.

(A9) In some embodiments of at least one of the RTS devices of (A4)-(A8), the RTS device has an RTS clock signal; the RTS clock signal is initialized when the test sensor probe signal is received by the RTS; and the time shifting is with respect to the RTS clock signal.

(A10) In some embodiments of at least one of the RTS devices of (A4)-(A9), the mimicking that comprises the time shift that would result from a change in the position of the first virtual target is performed via digital signal processing.

(A11) In some embodiments of at least one of the RTS devices of (A4)-(A10), the RTS device: converts the test sensor probe signal to a digital test sensor probe signal; time shifts the digital test sensor probe signal to mimic the time shift that would result from a change in the position of the first virtual target; and converts the time shifted digital test sensor probe signal to an analog virtually reflected waveform.

(A12) In some embodiments of at least one of the RTS devices of (A2)-(A11), the shifting of a phase of the test sensor probe signal mimics a phase shift that would result from the velocity of the first virtual target.

(A13) In some embodiments of at least one of the RTS devices of (A2)-(A12), the time shifting is initiated by detection of the test sensor probe signal.

(A14) In some embodiments of at least one of the RTS devices of (A1)-(A13), the test sensor probe signal comprises a signal that increases in frequency with time.

(A15) In some embodiments of at least one of the RTS devices of (A1)-(A14), the computer-readable instructions further cause the processor to perform acts comprising: generating a position of the first virtual target with respect to a position of the test sensor; generating a velocity of the first virtual target; generating a second virtual target for the radar target simulation; generating a position of the second virtual target with respect to a position of the test sensor; generating a velocity of the second virtual target; generating the virtually reflected waveform by: shifting a phase of the test sensor probe signal by a Doppler correction according to the velocity of the first virtual target and the second virtual target; time shifting the test sensor probe signal according to the position of the first virtual target and the position of the second virtual target; and transmitting the virtually reflected waveform responsive to the test sensor probe signal for the radar target test simulation.

(A16) In some embodiments of the RTS device of (A15), the shifting of the phase of the test sensor probe signal by the Doppler correction mimics a Doppler shift that would result from the velocity of the first virtual target.

(A17) In some embodiments of the RTS device of (A15), the time shifting of the test sensor probe signal mimics a time shift that would result from the change in the position of the first virtual target and results from transmitting the virtually reflected waveform faster than the test sensor probe signal was received.

(A18) In some embodiments of at least one of the RTS devices of (A15)-(A17), the time shifting is initiated by detection of the test sensor probe signal.

(B1) In another aspect, a method of simulating a radar target detection is described herein. The method includes receiving a test sensor probe signal from a test sensor; generating a first virtual target for a radar target simulation; and transmitting a virtually reflected waveform responsive to the test sensor probe signal for the radar target test simulation, wherein the virtually reflected waveform is based at least in part on a change in position of the first virtual target.

(B2) In some embodiments of the method of (B1), the method further includes generating the position of the first virtual target with respect to a position of the test sensor; generating a velocity of the first virtual target; generating the virtually reflected waveform by: shifting a phase of the test sensor probe signal by a Doppler correction according to the velocity of the first virtual target; and time shifting the test sensor probe signal according to the change in position of the first virtual target to mimic a time shift that would result from the change in the position of the first virtual target and result from transmitting the virtually reflected waveform faster than the test sensor probe signal was received.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

We claim:

1. A radar target simulator (RTS) device, comprising:

a processor; and memory that stores computer-readable instructions that, when executed by the processor, cause the processor to perform acts comprising:

receiving a test sensor probe signal from a test sensor, wherein the test sensor probe signal comprises one or more chirps, wherein each chirp comprises a continuous change in frequency over time;

generating a first virtual target for a radar target test simulation;

generating, based at least in part on a change in a position of the first virtual target, a virtually reflected waveform by time shifting the test sensor probe signal according to per-frame position information of the first virtual target to account for range migration across and within the one or more chirps; and transmitting, responsive to the test sensor probe signal for the radar target test simulation, the virtually reflected waveform with a forward or a backward transmission time relative to receipt of the test sensor probe signal under control of a synchronized or triggered RTS clock.

2. The RTS device of claim 1, wherein the acts further comprise:

generating the change in position of the first virtual target with respect to a position of the test sensor;

generating a velocity of the first virtual target; and wherein generating the virtually reflected waveform further comprises:

shifting a phase of the test sensor probe signal by a Doppler correction according to the velocity of the first virtual target; and time shifting the test sensor probe signal according to the change in position of the first virtual target.

3. The RTS device of claim 2, wherein the virtually reflected waveform mimics a waveform that would result from reflecting the test sensor probe signal from the first virtual target.

4. The RTS device of claim 2, wherein time shifting the test sensor probe signal mimics a time shift that would result from the change in the position of the first virtual target.

5. The RTS device of claim 4, wherein the time shifting results from transmitting the virtually reflected waveform faster than the test sensor probe signal was received.

6. The RTS device of claim 4, wherein the time shifting results from transmitting the virtually reflected waveform slower than the test sensor probe signal was received.

7. The RTS device of claim 4, wherein the time shifting is with respect to a common clock signal shared by the test sensor and the RTS device.

8. The RTS device of claim 4, wherein:
the test sensor has a test sensor clock signal;
the RTS device has an RTS clock signal;
the test sensor clock signal is synchronized with the RTS clock signal; and
the time shifting is with respect to the RTS clock signal.

9. The RTS device of claim 4, wherein:
the RTS device has an RTS clock signal;
the RTS clock signal is initialized when the test sensor probe signal is received by the RTS; and
the time shifting is with respect to the RTS clock signal.

10. The RTS device of claim 4, wherein mimicking the time shifting that would result from the change in the position of the first virtual target is performed via digital signal processing.

11. The RTS device of claim 4, wherein the acts further comprise:
converting the test sensor probe signal to a digital test sensor probe signal;
time shifting the digital test sensor probe signal to mimic the time shift that would result from the change in the position of the first virtual target; and
converting the time shifted digital test sensor probe signal to an analog virtually reflected waveform.

12. The RTS device of claim 2, wherein shifting of the phase of the test sensor probe signal mimics a phase shift that would result from the velocity of the first virtual target.

13. The RTS device of claim 2, wherein the time shifting is initiated by detection of the test sensor probe signal.

14. The RTS device of claim 1, wherein the acts further comprise:
generating a position of the first virtual target with respect to a position of the test sensor;
generating a velocity of the first virtual target;
generating a second virtual target for the radar target test simulation;
generating a position of the second virtual target with respect to a position of the test sensor;
generating a velocity of the second virtual target;
wherein generating the virtually reflected waveform further comprises:
shifting a phase of the test sensor probe signal by a Doppler correction according to the velocity of the first virtual target and the second virtual target; and
time shifting the test sensor probe signal according to the position of the first virtual target and the position of the second virtual target; and
transmitting the virtually reflected waveform responsive to the test sensor probe signal for the radar target test simulation.

15. The RTS device of claim 14, wherein shifting the phase of the test sensor probe signal by the Doppler correction mimics a Doppler shift that would result from the velocity of the first virtual target.

16. The RTS device of claim 14, wherein time shifting the test sensor probe signal mimics a time shift that would result from the change in the position of the first virtual target and results from transmitting the virtually reflected waveform faster than the test sensor probe signal was received.

17. The RTS device of claim 14, wherein the time shifting is initiated by detection of the test sensor probe signal.

18. A method of simulating a radar target detection comprising:
receiving a test sensor probe signal from a test sensor, wherein the test sensor probe signal comprises one or more chirps, wherein each chirp comprises a continuous change in frequency over time;
generating a first virtual target for a radar target test simulation;
generating, based at least in part on a change in a position of the first virtual target, a virtually reflected waveform by time shifting the test sensor probe signal according to per-frame position information of the first virtual target to account for range migration across and within the one or more chirps; and
transmitting, responsive to the test sensor probe signal for the radar target test simulation, the virtually reflected waveform with a forward or a backward transmission time relative to receipt of the test sensor probe signal under control of a synchronized or triggered RTS clock.

19. The method of claim 18, further comprising:
generating the position of the first virtual target with respect to a position of the test sensor;
generating a velocity of the first virtual target; and
wherein generating the virtually reflected waveform further comprises:
shifting a phase of the test sensor probe signal by a Doppler correction according to the velocity of the first virtual target; and
time shifting the test sensor probe signal according to the change in position of the first virtual target to mimic a time shift that would result from the change in the position of the first virtual target and result from transmitting the virtually reflected waveform faster than the test sensor probe signal was received.

* * * * *